(12) United States Patent
Sinden

(10) Patent No.: US 6,208,757 B1
(45) Date of Patent: *Mar. 27, 2001

(54) METHOD AND APPARATUS FOR RECONSTRUCTING HANDWRITTEN SYMBOLS FROM PARAMETRIC REPRESENTATIONS THEREOF

(75) Inventor: Frank William Sinden, Princeton, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/729,466

(22) Filed: Oct. 11, 1996

(51) Int. Cl.[7] ........................ G06K 9/00
(52) U.S. Cl. .................... 382/187; 382/201
(58) Field of Search ............... 382/186, 189, 382/187, 202, 119, 198, 241, 242, 203, 190, 201, 185; 345/16, 17; 178/18, 19, 20

(56) References Cited

U.S. PATENT DOCUMENTS

| | | | |
|---|---|---|---|
| 4,550,438 | * 10/1985 | Convis et al. | 178/18 |
| 5,185,818 | * 2/1993 | Warnock | 382/112 |
| 5,347,589 | * 9/1994 | Meeks et al. | 178/18 |
| 5,559,897 | * 9/1996 | Brown et al. | 382/186 |
| 5,577,135 | * 11/1996 | Grajski et al. | 382/187 |
| 5,596,656 | * 1/1997 | Goldberg | 382/186 |
| 5,698,822 | * 12/1997 | Haneda et al. | 178/18 |
| 5,761,328 | * 6/1998 | Solberg et al. | 382/198 |

* cited by examiner

Primary Examiner—Yon J. Couso

(57) ABSTRACT

A method and apparatus for reconstructing legible characters from stored data are described. For each of a plurality of handwritten strokes, a set of endpoint conditions is received. The endpoint conditions are data which define an initial and a final tangent angle for the stroke, and positions of an initial and a final endpoint of the stroke. For each set of endpoint conditions, an artificial stroke is constructed such that it satisfies the corresponding endpoint conditions and consists of at most three segments. Each of these segments consists of a straight line or an arc. Within any given stroke, lines and arcs may occur only in alternation.

14 Claims, 8 Drawing Sheets

METHOD AND APPARATUS FOR RECONSTRUCTING HANDWRITTEN SYMBOLS FROM PARAMETRIC REPRESENTATIONS THEREOF

FIELD OF THE INVENTION

This invention relates to the processing of human handwriting for purposes of information storage, automatic character recognition, and the like. More particularly, this invention relates to the processing of spatiotemporally sampled symbols, including the representation of such symbols in parametric form and the reconstruction of such symbols from their parameters to create legible characters.

ART BACKGROUND

The automatic analysis of human handwriting begins with sampling and digitization of the image or signal produced directly by human manipulation of a writing instrument, referred to herein, in a general sense, as a stylus. Purely graphical analysis can be performed on data sampled from a static image. However, for dynamic analysis, and more generally for analyzing data with reference to a temporal sequence, it is advantageous for the human subject to produce data by manipulating an instrumented stylus or tablet that permits spatiotemporal sampling.

One exemplary instrumented tablet is described in U.S. Pat. No. 5,463,388, issued on Oct. 31, 1995 to R. A. Boie et al. This tablet includes a rectangular array of capacitance-sensing electrodes. The position of a handheld stylus is determined, e.g., from the centroid of the respective capacitance values, as calculated in a microcontroller.

Parametric methods have been used for a number of years in connection, for example, with automatic signature verification. According to these methods, the signature (or other handwritten symbol) is represented in an abstract parameter space. The parametric representation consists of a set of numerical values of functions that are evaluated on the sampled data, and that relate to some combination of graphical and dynamic properties of the sampled data. Generally, a parametric representation is a condensed representation, in the sense that it occupies fewer bits of data-storage capacity than do the raw, sampled data.

Parametric representations of signatures have been used with some success for signature verification. In signature verification, the parameters are evaluated on a newly entered signature (or group of signatures), and the results are compared with a stored set of reference values. Such a procedure does not require the reconstruction, from parameters, of either the reference signature or the newly entered signature. Therefore, there is no need to choose parameters that preserve enough graphical information to reconstruct these signatures. Instead, parameters for signature verification are selected on the basis, e.g., of a tradeoff between selectivity and computational efficiency.

However, there is a need for a compact method for storing handwritten symbols that can later be reconstructed as legible characters. For such a purpose, it is not sufficient to use the abstract parameters that are often used in the context of signature verification. On the other hand, the more detailed the shape information that is used, the less compact the resulting storage method will be.

What the field has lacked, until now, are methods for storing and reconstructing characters that enjoy the benefits of compact parametric techniques, but still lead to clearly legible reconstructed characters.

SUMMARY OF THE INVENTION

I have invented such a reconstruction method, based on appropriate parametric methods of data storage.

An appropriate way of segmenting handwriting into "strokes" and then representing each such stroke by a set of values for a small number of parameters (the "standard parameter set") is described in my co-pending U.S. patent application Ser. No. 08/729,463 "Method And Apparatus For Parametric Representation Of Handwritten Symbols," which is hereby incorporated by reference. The strokes generated by the method therein described are free of major inflection points (i.e., points at which the curvature changes sign). Taking account of this property, the stroke reconstruction method described below always produces reconstructed strokes that are entirely free of inflection points. Because minor inflection points generated by noise and waviness are lost, the reconstructed strokes are often smoother than the originals. Although those skilled in the art could modify the method described below to accommodate major inflection points, I have found it preferable on grounds of simplicity to segment the handwriting so they do not occur inside of strokes.

The standard parameter set for a particular stroke comprises the x and y coordinates of the stroke's initial and final endpoints, the arc length s of the stroke, the initial tangent angle $\theta$, and the net turning angle $\phi$.

The initial tangent angle $\theta$ is defined with reference to the line through the endpoints; it is the angle from this line to the stroke's tangent at the initial endpoint.

The net turning angle $\phi$ is defined with reference to a moving tangent. If the tangent is envisaged as a rigid rod lying against the stroke, then $\phi$ is the net angle through which the rod turns as the point of tangency traverse the stroke from its initial to its final endpoint. (In accordance with mathematical convention, counterclockwise turning is counted as positive and clockwise turning is counted as negative.) Since the stroke is free of major inflection points, the tangent turns primarily in one direction (clockwise or counterclockwise) during its traversal of the stroke.

The present invention involves reconstruction of legible symbols from parametric data of the kind described above. These data are preferably derived using the methods described in U.S. patent application Ser. No. 08/729,463 cited above, but the use of other methods to derive the same or similar data will not diminish the usefulness of the present invention for reconstructing legible symbols therefrom.

Briefly, the present invention in a broad aspect involves reconstructing one or more strokes from their respective standard parameter sets by drawing each stroke as a sequence of smoothly joined straight lines and circular arcs of common radius. The largest number of segments (lines and arcs) needed to reconstruct any stroke is three. The segments are found by a simple algorithm.

BRIEF DESCRIPTION OF THE DRAWINGS

In FIG. 2 $s < s_T$ and the curve is of the arc-line-arc type; in FIG. 3 $s = s_T$ and the curve is transitional; in FIG. 4 $s > s_T$ and the curve is of the line-arc-line type.

Only the value of s differs from one figure to the next. In FIG. 5 $s<s_T$ and the curve is of the arc-line-arc type; in FIG. 6 $s=s_T$ and the curve is transitional; in FIG. 7 $s>s_T$ and the curve is of the line-arc-line type.

DETAILED DESCRIPTION

Figure 1:
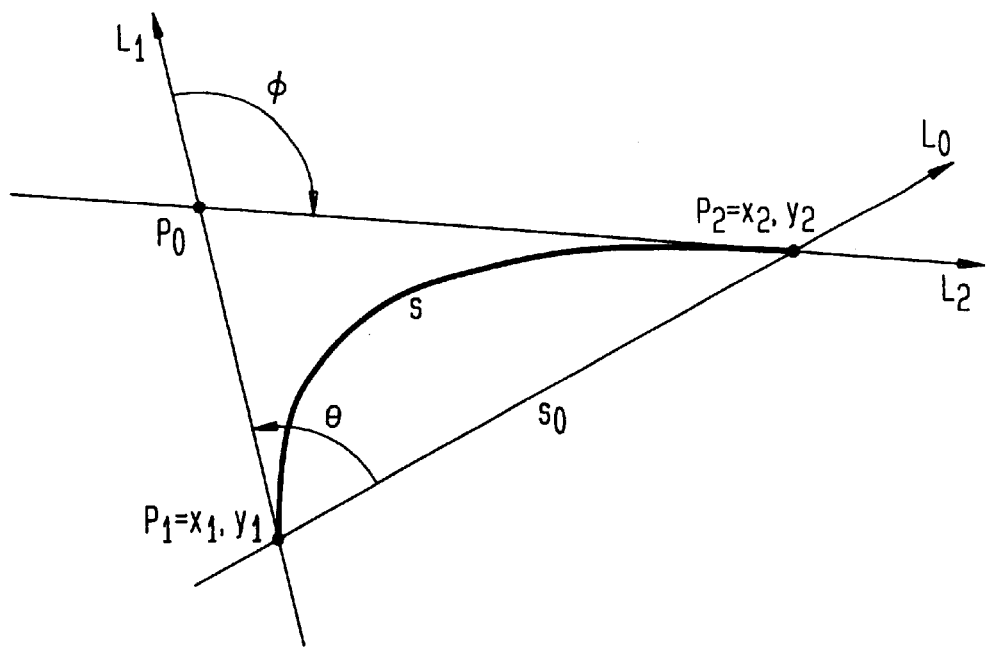
FIG. 1 depicts the standard parameter set for stroke representations, together with some auxiliary labels.

The standard parameter set for an exemplary curve is illustrated in FIG. 1. As noted above, the parameters include the Cartesian coordinates $x_1,y_1$ and $x_2,y_2$ of the initial and final endpoints, the arc length s, the angle $\theta$ of the initial tangent measured from the line through the endpoints, and the angle $\phi$ through which the tangent turns as the point of tangency traverses the curve. As shown in FIG. 1, $\phi$ can be measured from the initial to the final tangent.

For convenience I will denote the initial and final endpoints by $P_1$ and $P_2$, and the initial and final (directed) tangents by $L_1$ and $L_2$. Any directed curve segment will be said to satisfy the endpoint conditions if its initial and final endpoints coincide with $P_1$ and $P_2$ and if its initial an final tangents coincide with $L_1$ and $L_2$. It will be said to be a feasible reconstruction curve if, in addition, it is free of inflection points and if its arc length equals the specified value of s.

Also for convenience, I will denote the directed line through $P_1$ and $P_2$ (directed from $P_1$ and $P_2$) by $L_0$ and I will denote the intersection of $L_1$ to $L_2$ by $P_0$. In addition I will denote the straight line distance between the endpoints by $s_0$. In order for a feasible reconstruction curve to exist, note that s must be greater than or equal to $s_0$. Other, less obvious conditions, discussed below, must also hold.

If a feasible reconstruction curve exists for a given set of values for the standard parameters, then an infinite family of such curves exists. One way to select a unique curve from this family is to minimize or maximize some quantity associated with the curves. For example, the curve for which the integral of squared curvature is minimal selects what could be called the spring wire curve. This is the curve assumed by a piece of springy wire of length s that is constrained to satisfy the endpoint conditions.

While the spring wire curve almost always provides a good visual representation of the original stroke, it is slow and cumbersome to calculate. The preferred curve selection method described below entails much less calculation.

It can be shown that if there exist any feasible reconstruction curves (as defined above), then there exists a unique such curve composed of a minimal number of smoothly joined segments that are alternately straight lines and circular arcs of common curvature. "Smoothly joined" means that the tangent turns continuously (i.e., there are no corners) where arcs and lines are joined. The largest number of segments ever required is three. The possible sequences, then, are arc-line-arc and line-arc-line (and in special cases, the shorter sequences arc-line, line-arc, arc and line).

Visually, the reconstruction curves provided by this method are about as good as the spring wire curves and sometimes better.

If s is only slightly longer than $s_0$, then the unique reconstruction curve is of the arc-line-arc type. The curve may be visualized as follows with the aid of FIG. 2. Imagine two discs of very small diameter attached at their edges to the endpoints $P_1$ and $P_2$ in such a way that they are tangent to $L_1$ and $L_2$ respectively. Imagine further a string of length s joining the endpoints and draped appropriately around the two discs. Now imagine the two discs growing simultaneously in diameter while their points of tangency remain fixed. When the string goes taut, it coincides with the reconstruction curve.

Figure 4:
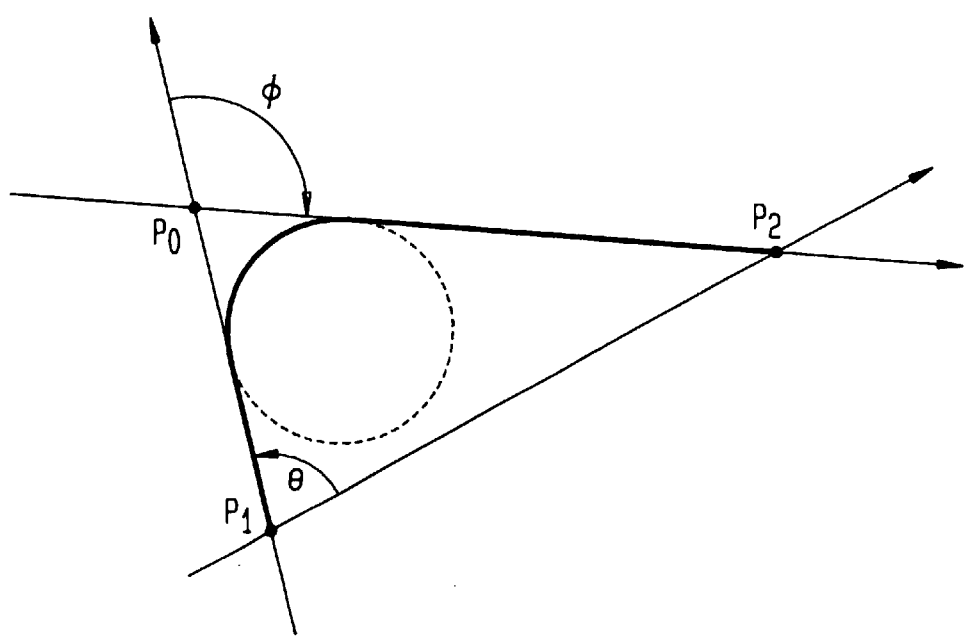

If s is long enough compared to $s_0$, then the unique reconstruction curve is of the line-arc-line type. This is illustrated in FIG. 4. Note that the single arc is tangent to both $L_1$ and $L_2$ and that the two line segments lie along $L_1$ and $L_2$.

Figure 2:
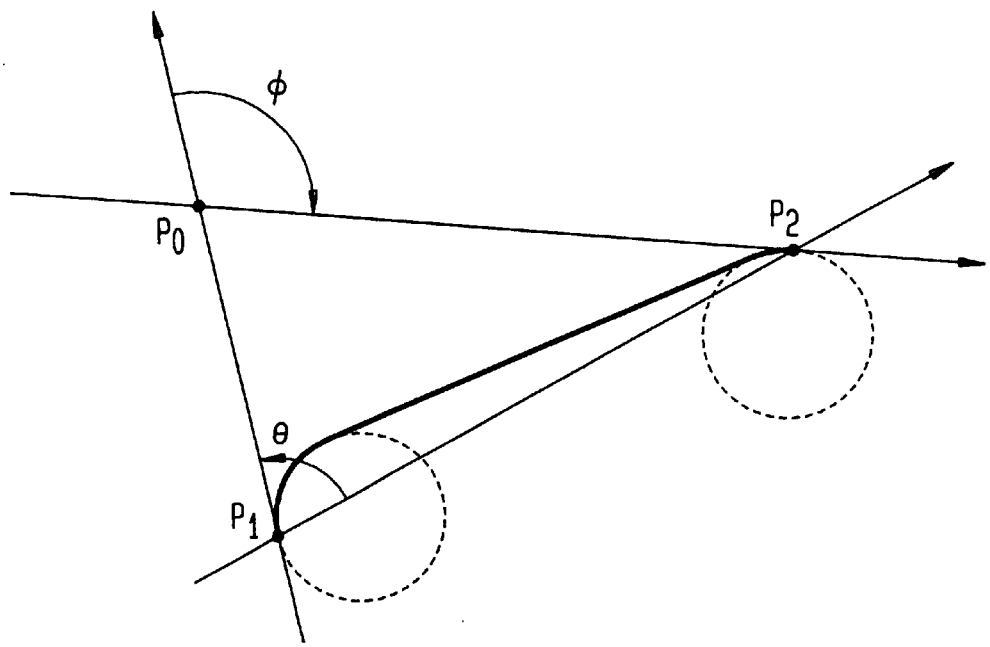
FIGS. 2–4 show the reconstruction curves for an exemplary set of values for the parameters $x_1, y_1, x_2, y_2, \theta, \phi$. Only the value of s differs from one figure to the next.
Figure 3:
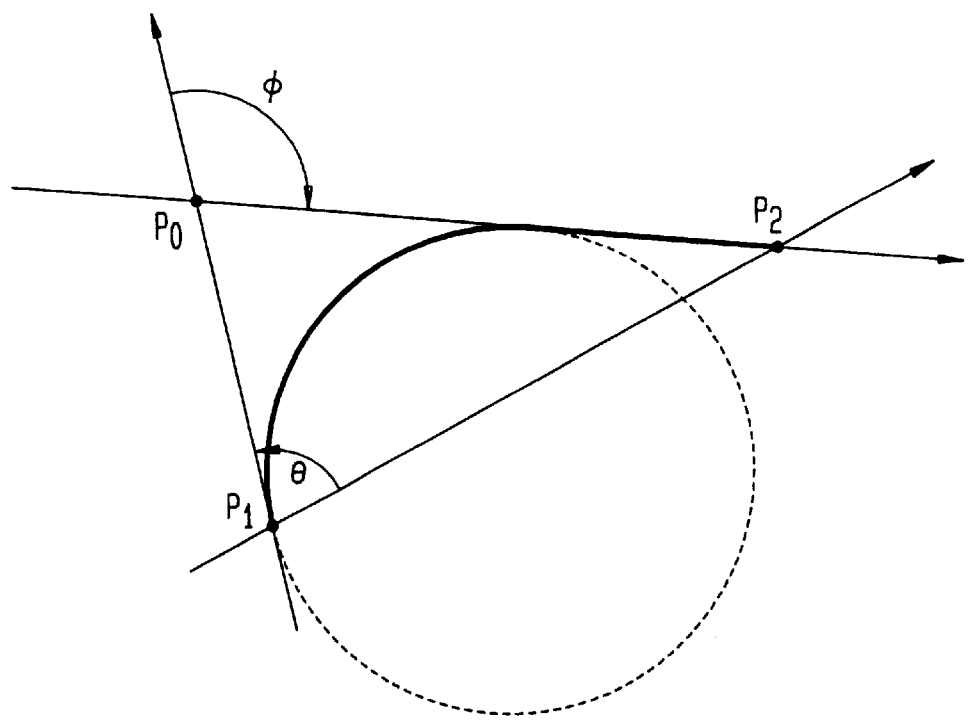

Intermediate between the values of s shown in FIGS. 2 and 4, there is a unique value of s (I will call it $s_T$) for which the reconstruction curve has fewer than three segments. FIG. 3 shows this curve for the example of FIGS. 2 and 4. It represents the transition from arc-line-arc to line-arc-line. That is to say, for values of arc length s between $s_0$ and $s_T$, the reconstruction curve is of the arc-line-arc type; for values greater than $s_T$ the reconstruction curve (if it exists) is of the line-arc-line type. Note that in the sequence of FIGS. 2, 3, 4, all of the standard parameters have the same values except the arc length s, which becomes progressively longer.

In the example shown in FIGS. 2, 3 and 4, there is an upper limit to the arc length s. We will denote by $s_p$ the length of the path from $P_1$ along $L_1$ to $P_0$ and from there along $L_2$ to $P_2$ (See FIG. 1.) If $s>s_p$, then in this example no feasible reconstruction curves exist. More specifically, any curve with $s>s_p$ that satisfies the endpoint conditions of this example necessarily has inflection points and is therefore not a feasible reconstruction curve.

Figure 5:
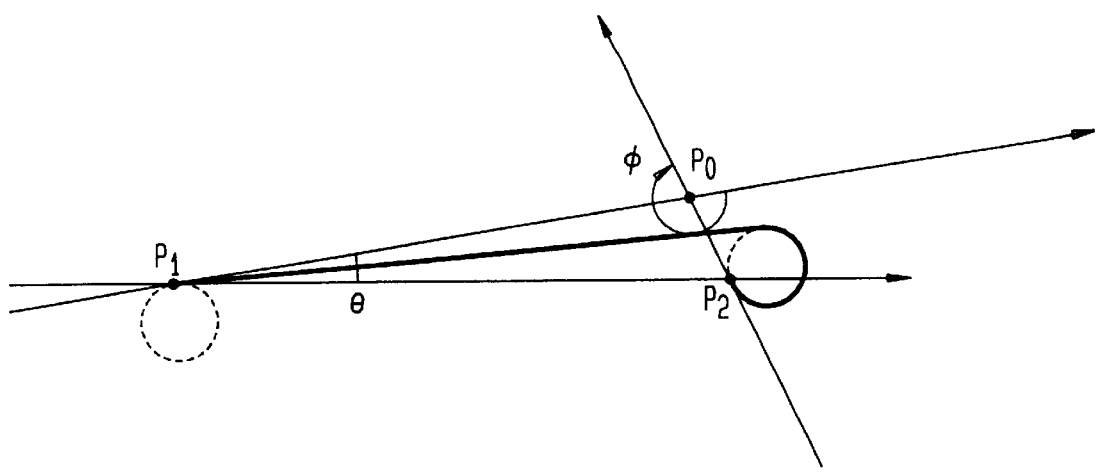
FIGS. 5–7 show the reconstruction curves for a different exemplary set of values for the parameters $x_1, y_1, x_2, y_2, \theta, \phi$.
Figure 6:
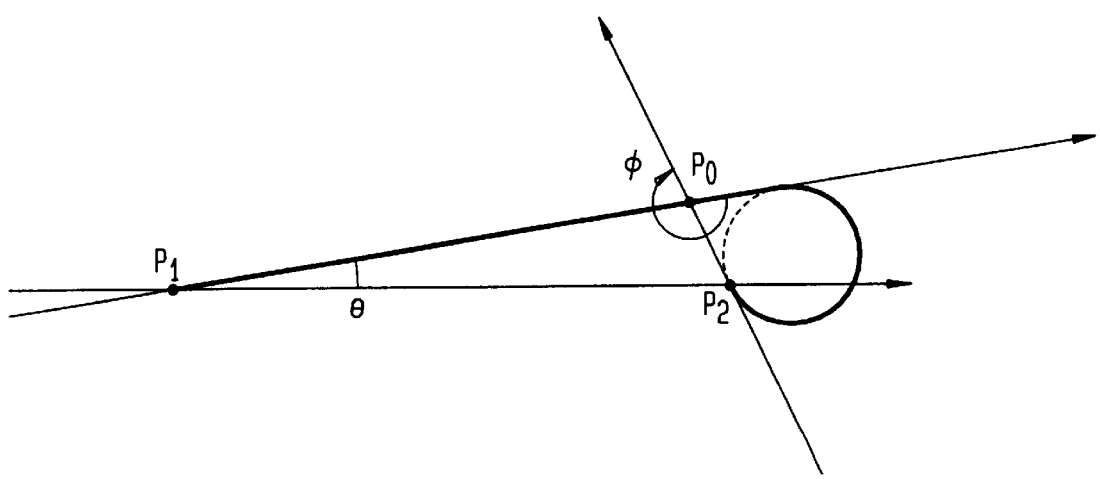
Figure 7:
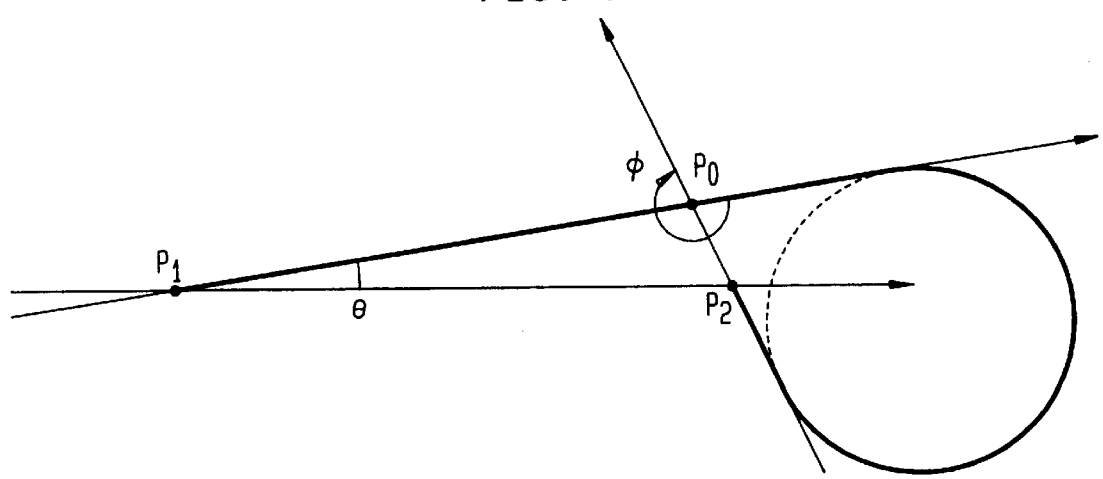
Figure 8:
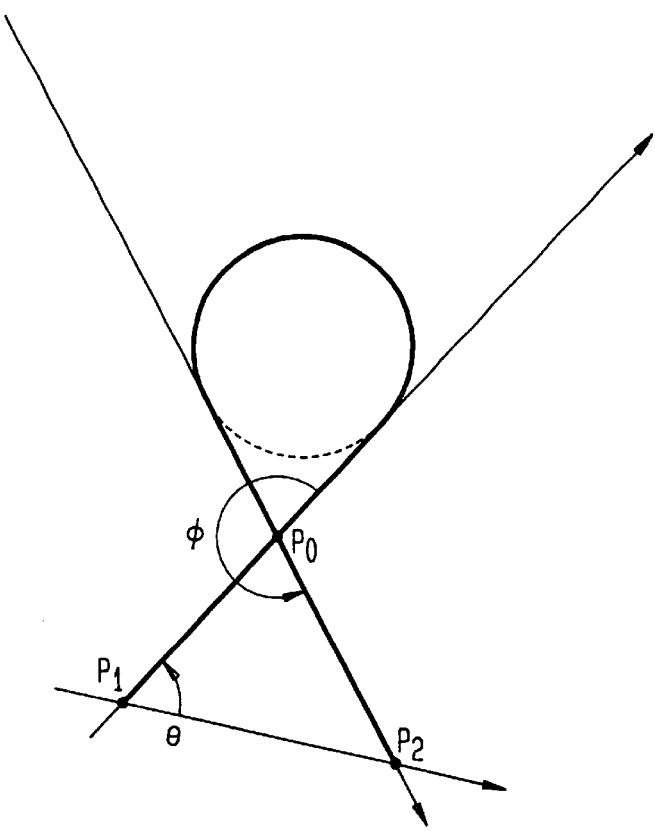
FIG. 8 shows the reconstruction curve for yet another exemplary set of parameter values. The curve is of the line-arc-line type.

FIGS. 5, 6 and 7 show the corresponding cases (i.e., $s<s_T$, $s=s_T$ and $s>s_T$) for a different example in which there is no upper limit on s One further example is shown in FIG. 8. In this example there is a lower bound on s: If $s<s_p$, no feasible reconstruction curve exists; if $s>s_p$, the reconstruction curve is of the line-arc-line type and it always contains a loop.

A preferred procedure for calculating reconstruction curve data first determines the type of the reconstruction curve. The procedure recognizes four cases defined by the signs of the expressions $$(\sin \theta/2)(\sin(\theta+\phi)/2) \text{ and } |\phi|-\pi$$

Case 1: $(\sin\theta/2)(\sin(\theta+\phi)/2)<0$ and $|\phi|-\pi \geq 0$

This case is exemplified by FIGS. 5, 6, and 7. The following calculation finds the value of $s_T$. When $s=s_T$, the reconstruction curve contains a single arc and a single line. Let A denote the length of the arc and L the length of the line.

---

If $\cos(\Theta+\phi) - \cos\Theta > 0$, then     $A=s_o \, |\phi\sin(\Theta+\phi)|/(1-\cos\phi)$
Otherwise     $A=s_o \, |\phi\sin\Theta|/(1-\cos\phi)$
If $\sin\Theta \sin(\Theta+\phi) > 0$, then     $L=s_o \, |\sin(\Theta+\phi)| + |\sin\Theta|/|\sin\phi|)$

| Otherwise | $L = s_0 \|\sin(\Theta+\phi)\| - \|\sin\phi\|/\|\sin\phi\|)$ |
| Then | $s_T = A + L$ |

If $s < s_T$, then the reconstruction curve is of the arc-line-arc type.

If $s > s_T$, then the reconstruction curve is of the line-arc-line type.

Case 2: $(\sin \theta/2)(\sin (\theta+\phi)/2) < 0$ and $\|\phi\| - \pi < 0$.

This case is exemplified by FIGS. 2, 3, and 4. The determination of curve type is the same as in Case 1 except that the final statement must be modified:

If $s > s_T$ and $s < s_p$, then the reconstruction curve is of the line-arc-line type;

if $s > s_p$, then no feasible reconstruction curves exist.

Case 3: $(\sin \theta/2)(\sin (\theta+\phi)/2) \geq 0$ and $\|\phi\| - \pi \geq 0$ This case is exemplified by FIG. 8.

If $s < s_p$, then no feasible reconstruction curves exist.

If $s \geq s_p$, then the reconstruction curve is of the line-arc-line type.

Case 4: $(\sin \theta/2)(\sin (\theta+\phi)/2) \geq 0$ and $\|\phi\| - \pi < 0$

In this case no feasible reconstruction curves exist.

It is to be expected that sets of standard parameter values (i.e., values of $x_y, y_1, x_2, y_2, \theta, \phi, s$) derived from handwriting by a method such as that described in co-pending U.S. patent application Ser. No. 08/729,463 cited above will usually be such that feasible reconstruction curves exist. However, because of ignored minor inflection points or other approximations, parameter sets for which feasible reconstruction curves do not exist may occasionally be presented. Such parameter sets will at least be close to ones that are feasible. A preferred way of dealing with these exceptional cases is to assign simple degenerate reconstruction curves to infeasible parameter sets according to the following rules:

In Cases 2 and 3 the reconstruction curve is the path from $P_1$ along $L_1$ to $P_0$ and from there to $P_2$ along $L_2$.

In Case 4 the reconstruction curve is the line segment joining $P_1$ and $P_2$.

These degenerate curves are almost always adequate representations of the original strokes.

Once the type of the reconstruction curve is known, parameters such as arc radii, arc center locations, angles subtended by arcs at their centers, line endpoints, etc. can be determined by well-known methods of analytic geometry, preferably using complex numbers to represent vectors and exponentials of imaginary numbers to represent circular arcs. Then by means of standard computer graphics, the reconstruction curve can be printed or displayed on a screen. Derivation of the pertinent parameters is further discussed in the Appendix, below.

Figure 9:
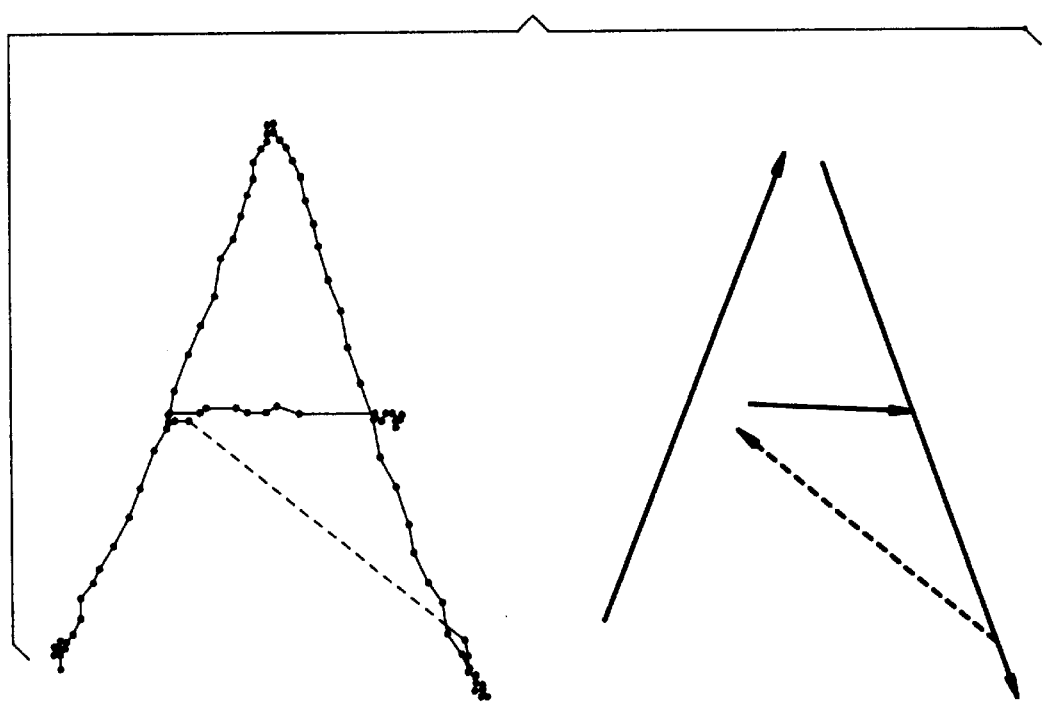
FIGS. 9–14 each compare a raw, sampled alphanumeric character to the character as reconstructed according to the invention.
Figure 10:
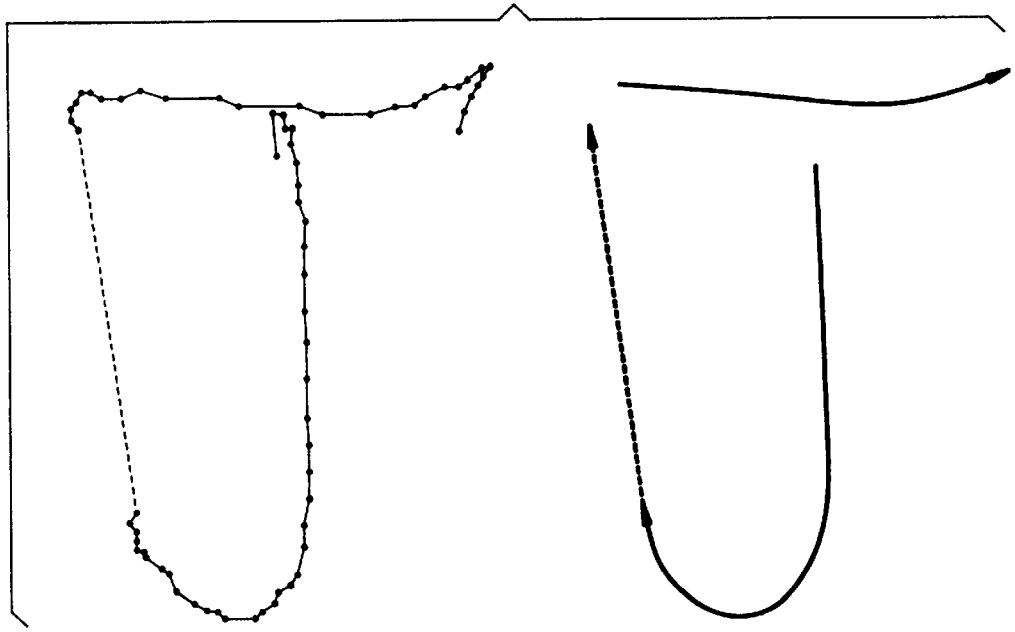
Figure 11:
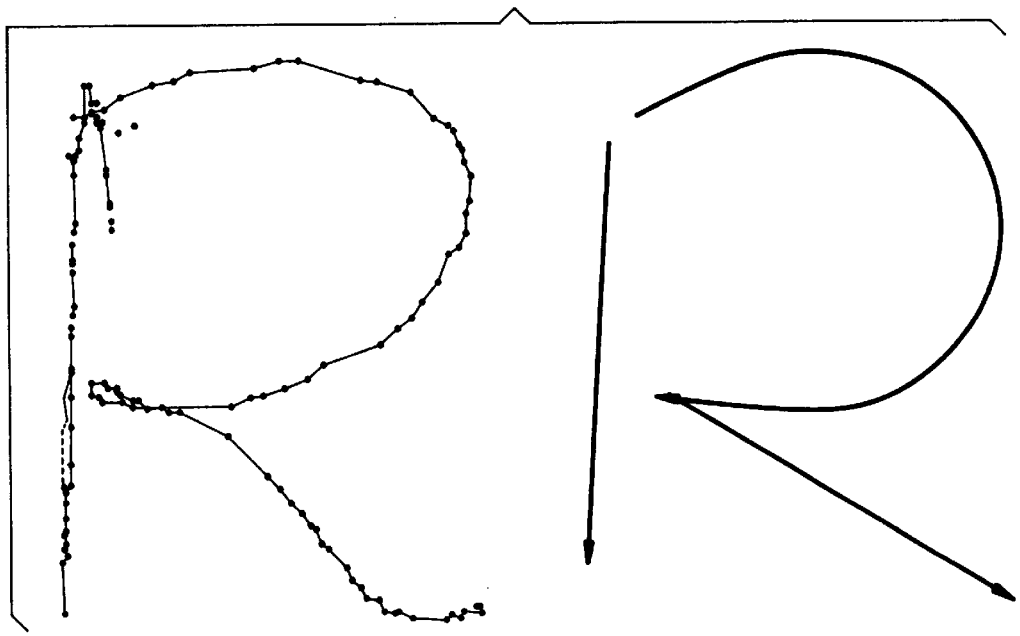
Figure 12:
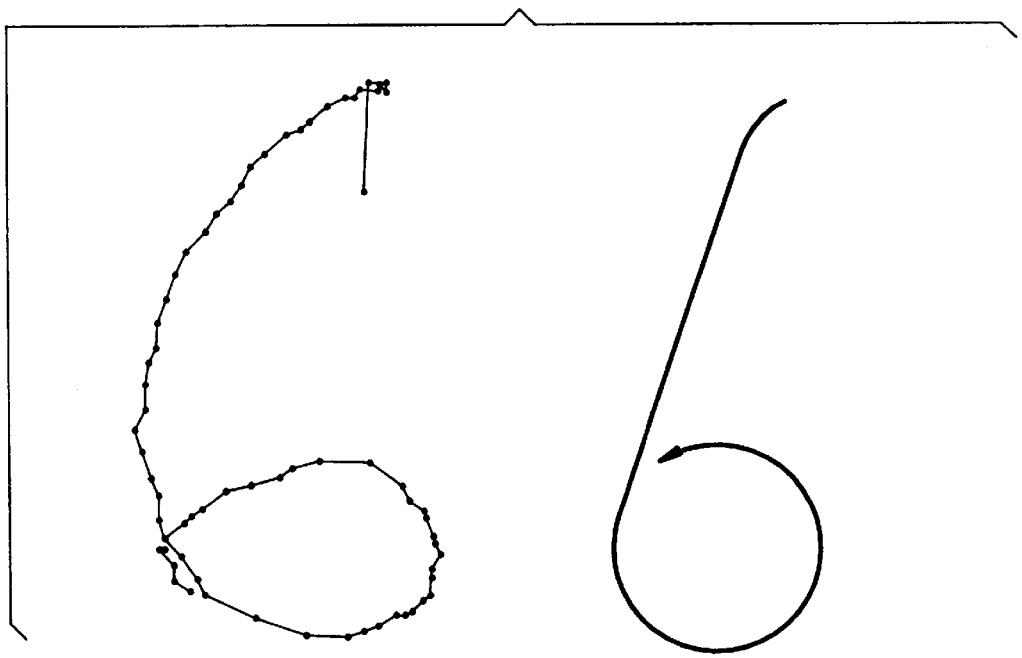
Figure 13:
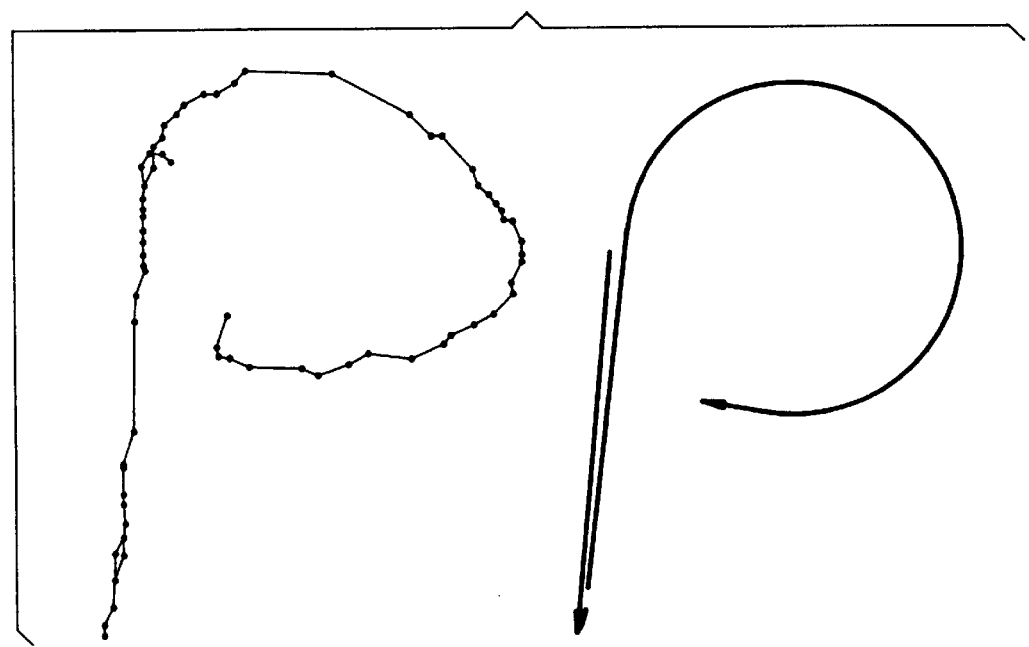
Figure 14:
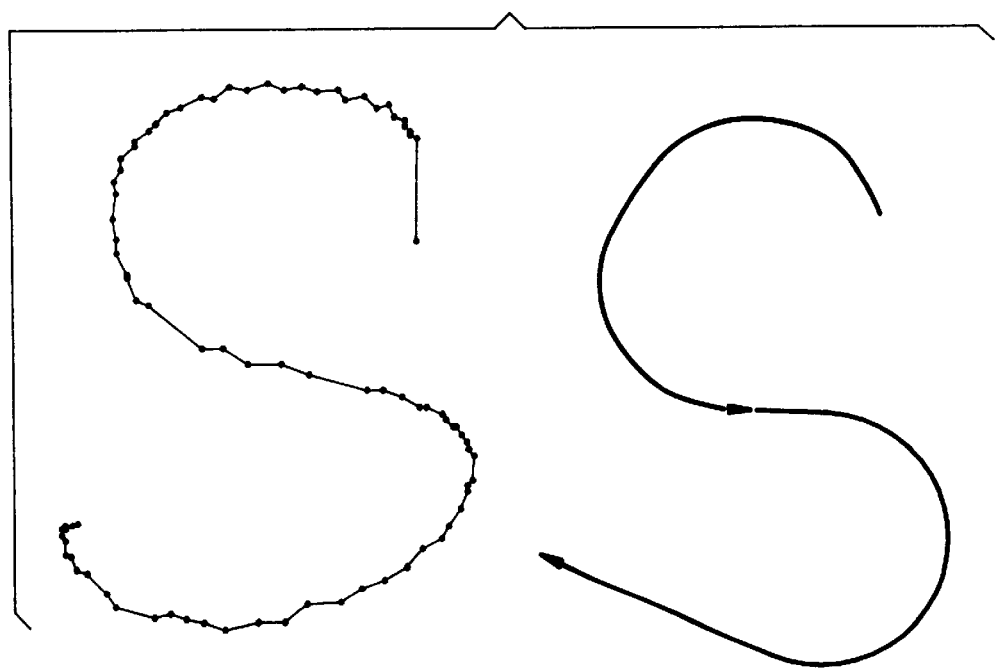

By way of illustration, FIG. 9 compares a raw, sampled Roman letter "A" (on the left) with the same letter as reconstructed using the inventive procedure (on the right). Similarly, FIG. 10 compares raw and reconstructed letters "J", FIG. 11 compares raw and reconstructed letters "R", FIG. 12 compares raw and reconstructed numerals "6", FIG. 13 compares raw and reconstructed letters "P", and FIG. 14 compares raw and reconstructed letters "S".

Figure 15:
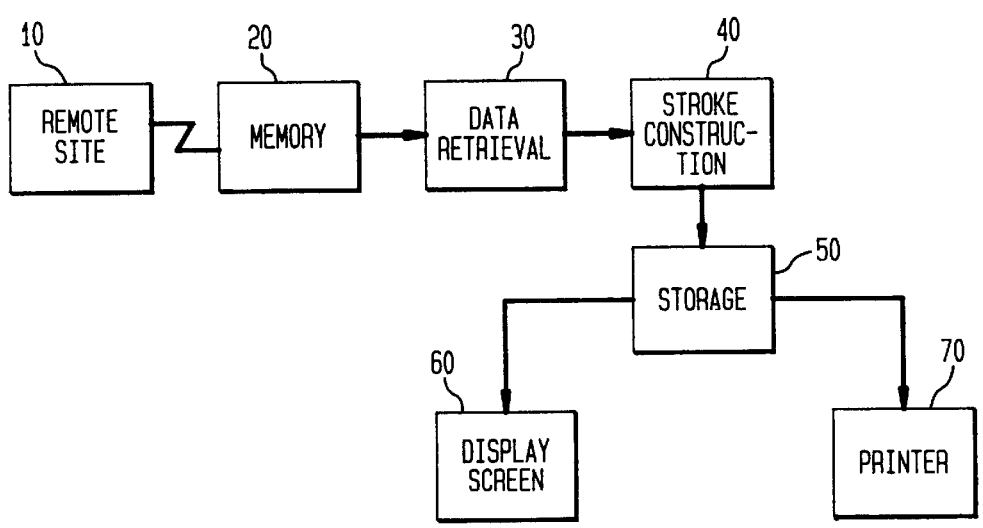
FIG. 15 is a schematic block diagram of an exemplary apparatus for carrying out the inventive method.

As illustrated in FIG. 15, illustrative apparatus for carrying out my method includes a digital memory device 20 for receiving and storing stroke-parameter data. Such data may be provided locally, or, e.g., they may be received from a remote site 10. A device 30, typically implemented in a digital computer operating under the control of an appropriate program, retrieves the stroke-parameter data and submits them to device 40, typically also implemented in a programmed computer, for the process of stroke construction. The output of this process is stored, typically as graphical data, in digital storage device 50. An output device retrieves the graphical data and displays it in a permanent or ephemeral form, as appropriate. Illustrative output devices shown in the figure are screen 60 and printer 70.

Figure 16:
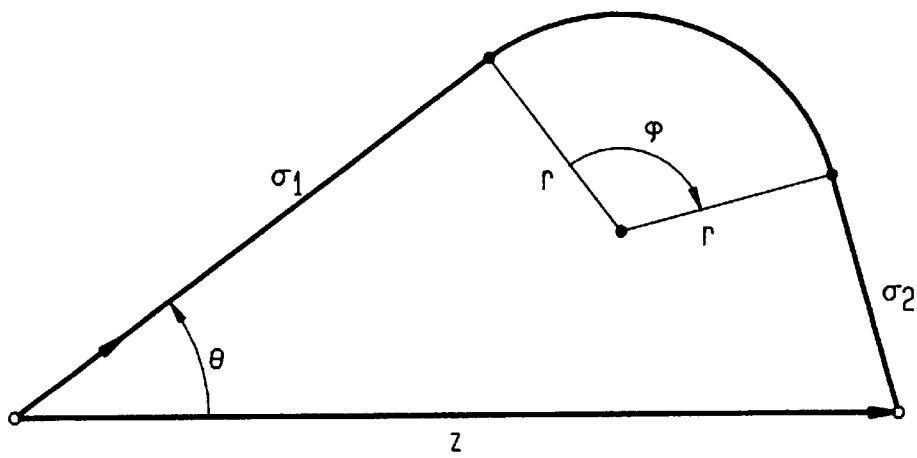
FIG. 16 illustrates a line-arc-line reconstruction according to the invention.

Shown in FIG. 16 is a line-arc-line reconstruction. The bounding line segments are indicated in the figure as vectors $\vec{\sigma}_1$ and $\vec{\sigma}_2$, having respective lengths $\sigma_1$ and $\sigma_2$. The arc included between them, as indicated in the figure, has turning angle $\phi$ and radius of curvature r. The endpoint vector, denoted $\vec{z}$ in the figure, has length $s_0$. Introduced below is a new angle $\theta'$, defined by $\theta' = +\phi$.

The reconstructed curve of FIG. 16 is defined by the endpoint conditions, together with the three lengths $\sigma_1$, $\sigma_2$, and r. These are conveniently expressed in terms of a determinant $\Delta$, defined by $\Delta = \phi \sin \phi - 2(1 - \cos \phi)$. This quantity is negative in value, except when $\phi = 0$, in which case $\Delta$ also equals 0. It will be noted that $\Delta$ appears in the denominators of the following expressions. However, when $\phi$ is near 0 (i.e., when there is little net change in the tangent angle), the stroke is simply represented by a line segment. Thus, there is no danger of division by zero.

The quantities $\sigma_1$, $\sigma_2$, and r are given by:

$$\sigma_1 = \frac{1}{\Delta}(s_0(\phi\sin\theta' + \cos\theta' - \cos\theta) - s(1 - \cos\phi))$$

$$\sigma_2 = \frac{1}{\Delta}(-s_0(\phi\sin\theta + \cos\theta' - \cos\theta) - s(1 - \cos\theta))$$

$$r = \left|\frac{1}{\Delta}(-s_0(\sin\theta' - \sin\theta) + s\sin\phi)\right|.$$

Figure 17:
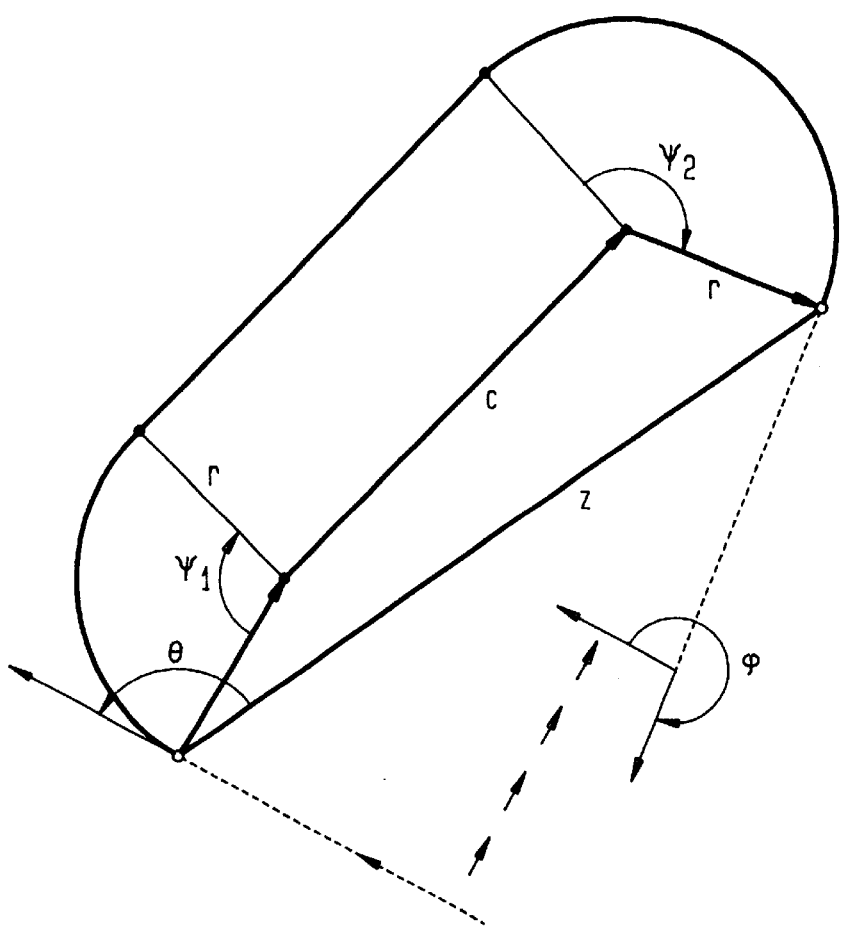
FIG. 17 illustrates an arc-line-arc reconstruction according to the invention.

Shown in FIG. 17 is an arc-line-arc reconstruction. The bounding arcs each have radius of curvature r, and they have respective turning angles $\psi_1$ and $\psi_2$. The respective centers of curvature of these arcs are separated by vector $\vec{c}$, which has length c. The vector $\vec{z}$ is as described above.

The reconstructed curve of FIG. 17 is defined by the endpoint conditions, together with the lengths r and c and the angles $\psi_1$ and $\psi_2$ subtended by the respective bounding arcs. It will be noted that the sum $\psi_1 + \psi_2$ is equal to the net tuning angle $\phi$.

The following pair of equations defines a quadratic in r. However, instead of solving the resulting quadratic equation directly, we find it more convenient to solve these equations for r in an iterative procedure according to well known techniques:

$$c^2 = s_0^2 - 2\lambda s_0(\sin \theta' - \sin \theta)r + 2(1 - \cos \phi)r^2.$$

$$c + r\|\phi\| = s.$$

The value of c is readily obtained from the resulting value of r. The value of $\psi_1$ is obtained from the following formulas:

$$\lambda = +1 \text{ if } \phi > 0$$

$$\lambda = -1 \text{ if } \phi < 0$$

$$\psi_2 = \phi - \psi_1$$

$$X = s_0\cos\theta - \lambda r\sin\phi$$

$$Y = s_0 \sin\theta + \lambda r(1 - \cos\phi)$$

$$\psi_1 = \arctan\frac{y}{x}$$

The value of $\psi_2$ is given by $\psi_2 = \phi - \psi_1$.

The invention claimed is:

1. A method for reconstructing legible characters from stored data, comprising:

for each of a plurality of handwritten strokes, some of which exhibit varying curvature, none of which exhibit corners, and none of which exhibit reversals of curvature, receiving data which define an initial and a final tangent angle for the stroke, and positions of an initial and a final endpoint of the stroke, said data to be referred to as a set of endpoint conditions for the stroke; and for each said set of endpoint conditions, constructing an artificial stroke that satisfies the corresponding endpoint conditions and consists of at most three segments, each of said segments being one of a straight line and an arc, said lines and arcs occurring in alternation within a given artificial stroke.

2. The method of claim 1, further comprising receiving data which define a stroke length s, and wherein the step of constructing a stroke is carried out such that the resulting artificial stroke has length s.

3. The method of claim 2, wherein the step of constructing a stroke is further carried out such that in any artificial stroke that comprises two circular arcs, said arcs have the same radius of curvature.

4. The method of any one of claims 1–3, wherein the receiving step comprises reading data from a digital memory device.

5. The method of any one of claims 1–3, wherein the receiving step comprises receiving data from a remote location.

6. The method of any one of claims 1–3, further comprising displaying each resulting artificial stroke.

7. The method of claim 6, wherein the displaying step comprises displaying each said stroke as an ephemeral image on a display device.

8. The method of claim 6, wherein the displaying step comprises printing each said stroke on a durable medium.

9. Apparatus for reconstructing legible characters from stored data, comprising:

a digital memory device for storing, for each of a plurality of handwritten strokes, some of which exhibit varying curvature, none of which exhibit corners, and none of which exhibit reversals of curvature, data which define an initial and a final tangent angle for the stroke, and positions of an initial and a final endpoint of the stroke, said data to be referred to as a set of endpoint conditions for the stroke;

means for reading said sets of endpoint conditions from said digital memory device;

means for constructing, for each said set of endpoint conditions, an artificial stroke that satisfies the corresponding endpoint conditions and consists of at most three segments, each of said segments being one of a straight line and an arc, said lines and arcs occurring in alternation within a given artificial stroke;

means for storing each artificial stroke resulting from said constructing step; and means for displaying each said artificial stroke.

10. Apparatus of claim 9, wherein the digital memory device is further adapted to store data which define a stroke length s, and wherein the constructing means are further adapted to construct each artificial stroke to have the corresponding length s.

11. Apparatus of claim 9 wherein the constructing means are further adapted to construct each artificial stroke comprising multiple arcs such that said arcs have the same radius of curvature.

12. Apparatus of any one of claims 9–11, further comprising means for receiving the sets of endpoint conditions from a remote location, and recording said sets of endpoint conditions in said digital memory device.

13. Apparatus of any one of claims 9–11, wherein said displaying means comprise a display screen.

14. Apparatus of any one of claims 9–11, wherein said displaying means comprise a printer.

* * * * *